United States Patent
Matsuda

(10) Patent No.: US 10,063,715 B2
(45) Date of Patent: Aug. 28, 2018

(54) MAINTENANCE SYSTEM AND MAINTENANCE METHOD

(71) Applicant: TOSHIBA TEC KABUSHIKI KAISHA, Shinagawa-ku, Tokyo (JP)

(72) Inventor: Okiharu Matsuda, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/671,237

(22) Filed: Aug. 8, 2017

(65) Prior Publication Data
US 2017/0366682 A1 Dec. 21, 2017

Related U.S. Application Data

(63) Continuation of application No. 14/521,720, filed on Oct. 23, 2014, now Pat. No. 9,762,749.

(51) Int. Cl.
H04N 1/00 (2006.01)
G07G 1/14 (2006.01)
G06Q 20/20 (2012.01)

(52) U.S. Cl.
CPC ....... *H04N 1/00015* (2013.01); *G06Q 20/202* (2013.01); *G06Q 20/209* (2013.01); *G07G 1/14* (2013.01); *H04N 1/00005* (2013.01); *H04N 1/00061* (2013.01); *H04N 1/00087* (2013.01); *H04N 1/00244* (2013.01); *H04N 2201/0003* (2013.01); *H04N 2201/0081* (2013.01); *H04N 2201/0082* (2013.01); *H04N 2201/0096* (2013.01)

(58) Field of Classification Search
CPC .......... H04N 1/00015; H04N 1/00005; H04N 1/00244; H04N 1/00087; H04N 1/00061; H04N 2201/0082; H04N 2201/0081; H04N 2201/0003; H04N 2201/0096; G07G 1/14; G06Q 20/202; G06Q 20/209
USPC ....................................................... 382/112
See application file for complete search history.

(56) References Cited

U.S. PATENT DOCUMENTS

| | | |
|---|---|---|
| 2010/0163613 A1 | 7/2010 | Bucher et al. |
| 2011/0025842 A1 | 2/2011 | King et al. |
| 2011/0052010 A1 | 3/2011 | Xu et al. |
| 2011/0090341 A1 | 4/2011 | Ikewada et al. |
| 2012/0200890 A1 | 8/2012 | Okumura |
| 2012/0269386 A1 | 10/2012 | Hankins et al. |

(Continued)

FOREIGN PATENT DOCUMENTS

JP 2006-203813 8/2006

OTHER PUBLICATIONS

Non-Final Office Action for U.S. Appl. No. 14/521,720 dated Oct. 5, 2015.

(Continued)

*Primary Examiner* — Amandeep Saini
(74) *Attorney, Agent, or Firm* — Amin, Turocy & Watson LLP

(57) ABSTRACT

According to one embodiment, a maintenance system includes an image pickup unit and a control unit. The image pickup unit picks up images of respective regions of a target apparatus defined beforehand. The control unit acquires image data picked up by the image pickup unit and calculates parameters of the target apparatus on the basis of the image data.

9 Claims, 7 Drawing Sheets

(56) References Cited

U.S. PATENT DOCUMENTS

2013/0035742 A1 2/2013 Talbot et al.
2013/0321842 A1* 12/2013 Yamamoto ......... H04N 1/00087
 358/1.13

OTHER PUBLICATIONS

Final Office Action for U.S. Appl. No. 14/521,720 dated Mar. 9, 2016.
Non-Final Office Action for U.S. Appl. No. 14/521,720 dated Aug. 4, 2016.
Final Office Action for U.S. Appl. No. 14/521,720 dated Feb. 1, 2017.

* cited by examiner

MAINTENANCE SYSTEM AND MAINTENANCE METHOD

CROSS-REFERENCE TO RELATED APPLICATIONS

This application is a Continuation of application Ser. No. 14/521,720 filed Oct. 23, 2014, the entire contents of which are incorporated herein by reference.

FIELD

Embodiments described herein relate generally to a technique for supporting maintenance work for an apparatus.

BACKGROUND

In a POS terminal (Point of sale Terminal) or the like, an expendable item to be used is determined beforehand, printing is performed by a printer unit in the POS terminal using the expendable item, and a check of the quality of the printing is performed. The quality check is performed by visually recognizing a printed barcode or the like or processing the barcode or the like with a verifier and reading a numerical value of the barcode. A maintenance person adjusts printing density and a head position to be optimum when necessary. In this way, setting adjustment ranges are provided in the printer unit to improve versatility for the expendable item.

The quality check is based on the premise that an assumed expendable item is used. However, because of the convenience of a user who uses the POS terminal, the assumed expendable item is sometimes not used during operation. Further, because of a reason that printing content is clearer when a denser image is formed, the printing content is set to be dense more than necessary. Depending on setting conditions, the life of the printer unit is reduced.

DETAILED DESCRIPTION

In general, according to one embodiment, a maintenance system includes an image pickup unit and a control unit. The image pickup unit picks up images of respective regions of a target apparatus defined beforehand. The control unit acquires image data picked up by the image pickup unit and calculates parameters of the target apparatus on the basis of the image data.

In the embodiment, images of a printing state and a setting state of a POS terminal are picked up using a camera function of a portable terminal. Obtained image data and present setting information are transmitted to a cloud server present on the outside by a communication function provided in the portable terminal or the POS terminal.

The server calculates setting information optimum for a printer unit on the basis of the image data and the present setting information. The information obtained by the calculation is, for example, an optimum value of printing density and optimum position information of a thermal head. The POS terminal updates the setting information with the obtained optimum value. The server displays the optimum position of the head on the portable terminal or notifies the POS terminal of the optimum position of the head. A maintenance person changes the position of the head, for example, manually, on the basis of the optimum position. Consequently, it is possible to extend the life of the printer unit of the POS terminal and provide a high-quality print while reducing energy consumption.

The embodiment is explained below.

Figure 1:
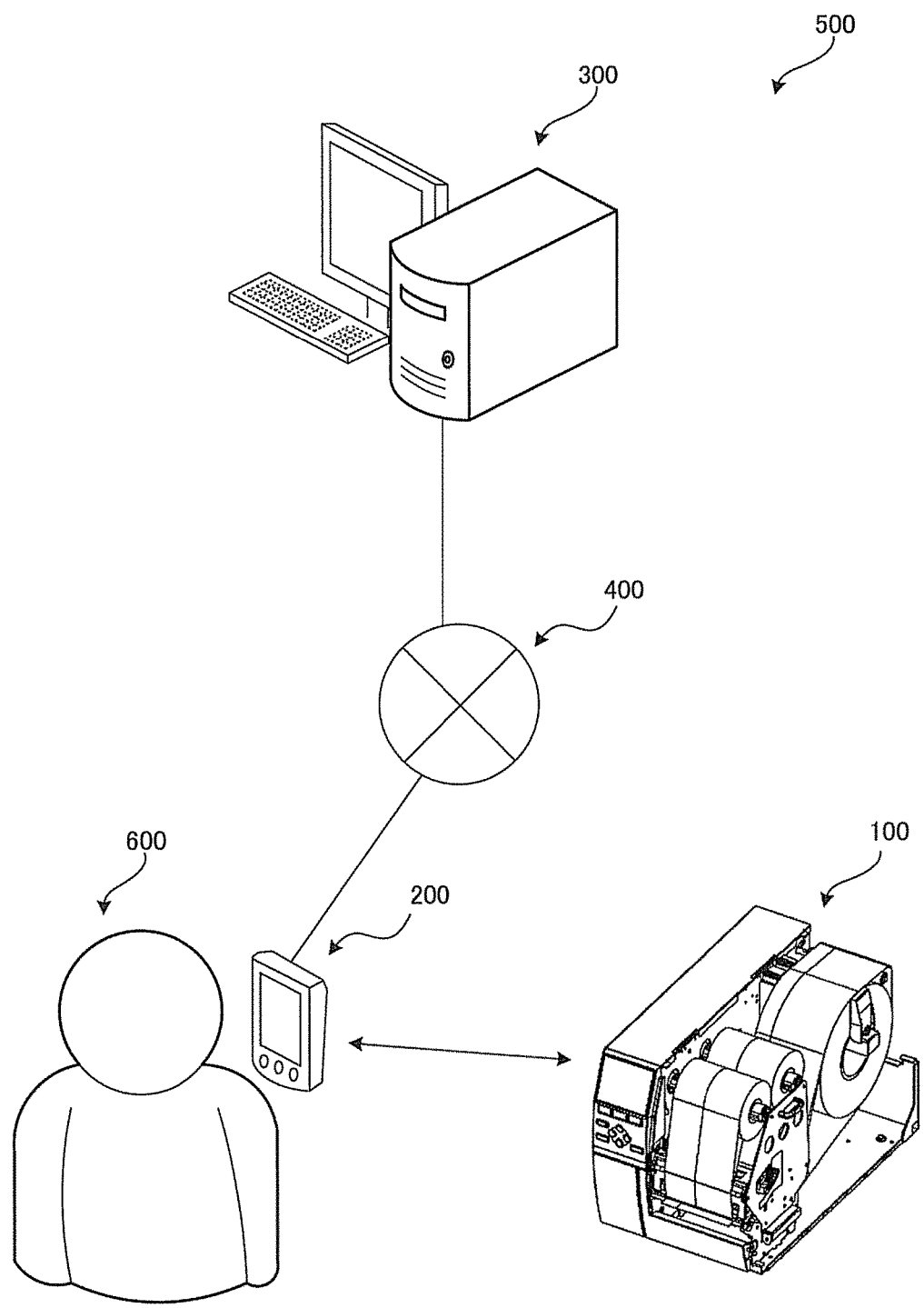
FIG. 1 is a diagram showing a configuration example of a maintenance system in an embodiment.

FIG. 1 is a diagram showing a system configuration example in the embodiment. A maintenance system 500 includes a portable terminal 200 and a server 300. A POS terminal 100 to be maintained may be included in the maintenance system 500. In the configuration shown in FIG. 1, the POS terminal 100 and the portable terminal 200 are arranged close to each other. The server 300 is set in a remote location on the outside. The portable terminal 200 is a terminal of a portable type carried by a maintenance person 600.

The portable terminal 200 and the server 300 can transmit and receive data to and from each other via a network 400 configured by a LAN (Local Area Network) or a wide area line network. The POS terminal 100 and the portable terminal 200 can transmit and receive data to and from each other using short range wireless communication or wireless LAN communication. The POS terminal 100 may be connected to the network 400. In this case, the server 300 and the POS terminal 100 can directly communicate with each other.

Figure 2:
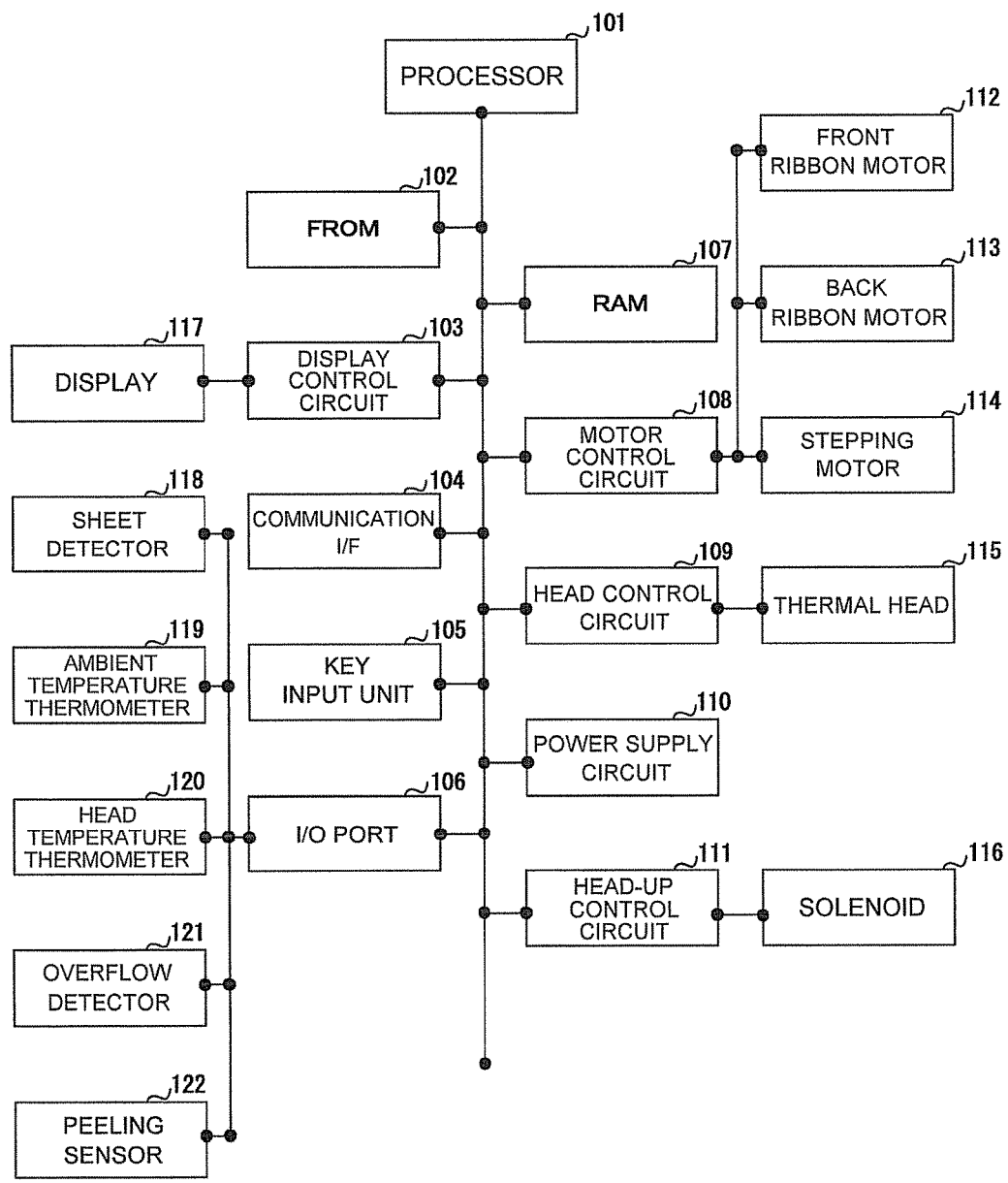
FIG. 2 is a diagram showing an internal configuration example of a POS terminal.
Figure 3:
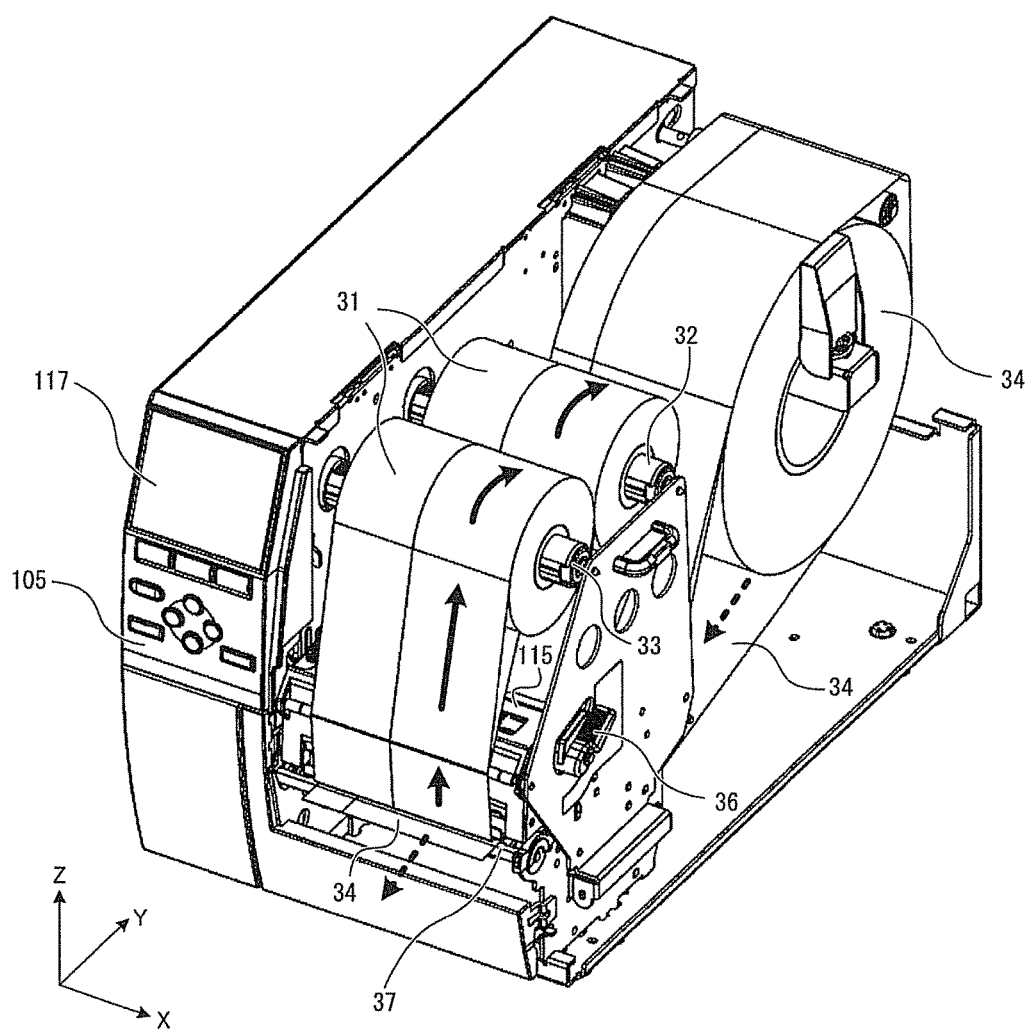
FIG. 3 is a perspective view of the POS terminal, a part of a protection cover of which is opened.

Internal configuration examples of the respective apparatuses are explained with reference to FIGS. 2 to 5. FIG. 2 is a block diagram showing a configuration example of the POS terminal 100. FIG. 3 is a perspective view of the POS terminal 100, a protection cover of which is removed. In this embodiment, the POS terminal 100 is an apparatus that prints a name of a commodity, a price of the commodity, a barcode, and the like on an unused sticker (an adhesive label) stuck to back-up paper (release paper). The printed sticker is affixed to a commodity or affixed to a commodity display case. This form is an example.

A processor 101 is an arithmetic unit such as a CPU (Central Processing Unit). The processor 101 outputs control instruction signals to respective kinds of hardware in the POS terminal 100 and performs operation control. A FROM 102 is a flash ROM (Read Only Memory) configured to store data in a nonvolatile manner. A computer program for controlling the apparatuses is stored in the FROM 102 beforehand. A RAM (Random Access Memory) 107 is a device configured to store data in a volatile manner. The RAM 107 temporarily stores a computer program and data. With this configuration, the processor 101 expands the computer program stored in the FROM 102 on the RAM 107 and executes an arithmetic operation to control the respective kinds of hardware according to a program code.

A display control circuit 103 is a circuit configured to control display in a display 117. The display control circuit 103 controls a screen of the display 117 according to an instruction received from the processor 101. The display 117 is a liquid crystal panel. The display 117 provides a user with information such as processing content. In this embodiment, the display 117 displays present setting information and the like to the maintenance person 600.

A communication interface (represented as I/F) 104 controls communication with an external apparatus. The communication I/F 104 is a device conforming to the standard of the short range wireless communication or the wireless LAN. The communication I/F 104 performs the short range wireless communication with the portable terminal 200 and communicates with an apparatus present in a site via a wireless access point. A device that performs wired LAN communication may be incorporated in the communication I/F 104 to enable communication by wire.

A key input unit 105 includes a key board including physical buttons and a control circuit configured to detect depression of keys. The key input unit 105 receives key inputs from the user and the maintenance person 600.

An I/O port 106 receives signals and data from respective units and outputs the signals and the data to the other units such as the processor 101. Specifically, the I/O port 106 receives signals and data from a sheet detector 118, an ambient temperature thermometer 119, a head temperature thermometer 120, an overflow detector 121, and a peeling sensor 122, converts the signals and the data, and outputs the signals and the data to the processor 101 and the like.

The sheet detector 118 detects presence or absence of roll paper 34 (see FIG. 3). In this embodiment, the roll paper 34 is obtained by rolling back-up paper to which unused stickers are stuck. A substance, a color of which changes in a part when the part is heated, is applied to the surface of the roll paper 34.

The ambient temperature thermometer 119 measures an environmental temperature in the POS terminal 100. The head temperature thermometer 120 measures the temperature of a thermal head 115. The head temperature thermometer 120 is arranged on the inside of the thermal head 115 or near the thermal head 115. The overflow detector 121 checks whether a rewinder (not shown in the figure) configured to wind and store the printed roll paper 34 is in a full state. The rewinder is an optional unit attached to a lower part (a lower part in a Z-axis direction in FIG. 3) of the POS terminal 100. The peeling sensor 122 detects, for example, a peeling state of a sticker.

A motor control circuit 108 controls rotating operations of various motors according to an instruction signal from the processor 101. Specifically, the motor control circuit 108 controls the rotation of a front ribbon motor 112, a back ribbon motor 113, and a stepping motor 114. The front ribbon motor 112 and the back ribbon motor 113 are motors for driving to rotate shafts around which thermal transfer ribbons 31 (see FIG. 3; hereinafter referred to as ribbons 31) are wound. The thermal transfer ribbons 31 are expendable items classified into a wax type, a semi-resin type, or a resin type.

The front ribbon motor 112 rotates a front shaft 33 shown in FIG. 3. The back ribbon motor 113 rotates a back shaft 32 shown in FIG. 3. The stepping motor 114 controls, for example, positioning of various devices. The stepping motor 114 may control rotating positions of the back shaft 32 and the front shaft 33.

A head control circuit 109 controls, according to an instruction from the processor 101, for example, heat generation timing of heat generating bodies provided inside the thermal head 115. The head control circuit 109 controls the heat generation timing of the heat generating bodies on the basis of printing image data such that an image of the printing image data is formed on the roll paper 34. The thermal head 115 includes a unit in which a plurality of heat generating bodies are aligned and arranged in an X-axis direction (see FIG. 3) and selectively applies a voltage to the heat generating bodies according to a signal from the head control circuit 109. Consequently, the heat generating bodies selectively generate heat and heated positions of the roll paper 34 corresponding to the heat generating bodies are discolored.

A power supply circuit 110 controls power supply to the units. A head-up control circuit 111 is a circuit for controlling a solenoid 116. The solenoid 116 moves a head position (an up down position in the Z-axis direction) of the thermal head 115 up and down.

The configuration of the POS terminal 100 is further explained with reference to FIG. 3. The back shaft 32 and the front shaft 33 are aligned and arranged in the same position in X-axis and Z-axis components and in different positions in a Y-axis component. The axes of the ribbons 31 are respectively inserted into the back shaft 32 and the front shaft 33. The ribbons 31 advance in a solid line arrow direction. A portion of the ribbon 31 present on the back shaft 32 side advances to a lower part of the thermal head 115 and thereafter changes the direction thereof upward in a discharge port 37 and advances to the front shaft 33 side. Therefore, in an initial state, the ribbon 31 is wound around the back shaft 32 in a large amount and stacked. When used over time, the ribbon 31 is wound around the front shaft 33 by a large amount and stacked. A rotating force of the front shaft 33 is applied to rotate the ribbon 31 as indicated by a solid line arrow. On the other hand, a rotating force of the back shaft 32 is applied in a direction opposite to the solid line arrow and with force weaker than the rotating force of the front shaft 33 in order to tense the ribbon 31.

The roll paper 34 advances in a direction indicated by a broken arrow direction in FIG. 3 and is subjected to printing processing in a lower part of the thermal head 115. The roll paper 34 subjected to the printing processing is discharged to the outside of the POS terminal 100 from the discharge port 37. When an optional rewinder is provided, the rewinder stores the discharged roll paper. A lever 36 is a lever capable of adjusting a head pressure. In this embodiment, the lever 36 can adjust the head pressure in two stages.

Figure 4:
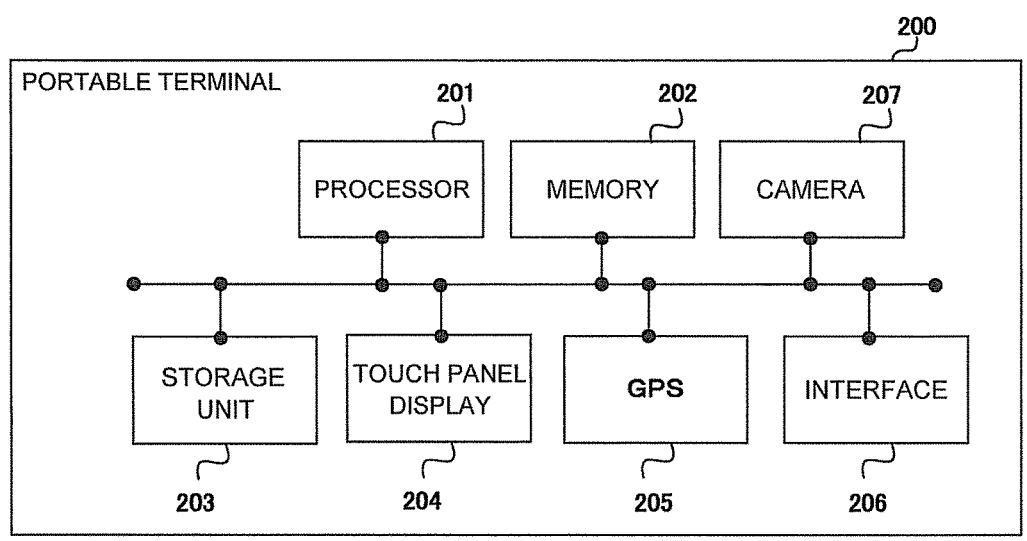
FIG. 4 is a diagram showing an internal configuration example of a portable terminal.

FIG. 4 is a block diagram showing an internal configuration example of the portable terminal 200. The portable terminal 200 is a conventional cellular phone, smart phone, or the like. The portable terminal 200 includes a processor 201, a memory 202, a storage unit 203, a touch panel display 204, a GPS (Global Positioning System) 205, an interface 206, and a camera 207.

The processor 201 is an arithmetic unit such as a CPU (Central Processing Unit). The processor 201 controls various kinds of hardware in the portable terminal 200. The memory 202 includes, for example, a RAM configured to store data in a volatile manner and a ROM configured to store data in a nonvolatile manner. The storage unit 203 is an auxiliary storage device configured to store data in a nonvolatile manner and is, for example, a flash ROM. Computer programs and parameter values are stored in the storage unit 203 beforehand. The computer programs include a computer program for performing image pickup at specified resolution and specified size using the camera 207, a computer program for communicating with the server 300 and the POS terminal 100 using the interface 206, and a computer program for displaying an operation procedure on the touch panel display 204.

The touch panel display 204 includes a display unit of a liquid crystal panel and an input unit of a touch sensor stacked and arranged on the surface of the display unit. The touch panel display 204 provides the maintenance person 600 with a screen for operation, receives an operation instruction from the maintenance person 600, and displays a processing result. The GPS 205 is a GPS receiver. The GPS 205 receives a signal from a satellite and converts the position of the GPS 205 itself into a numerical value. The interface 206 includes a communication device conforming to the short range wireless communication standard and a communication device connectable to the wide area line network and the wireless LAN.

In this embodiment, the interface 206 performs communication with the server 300 via the wireless LAN or the wide area line network and performs communication with the POS terminal 100 using the short range wireless communication or the wireless LAN. The camera 207 includes an image pickup device such as a CCD (charge-coupled device) image sensor and converts incident light into digital data. An image after the conversion is stored in, for example, the storage unit 203.

Figure 5:
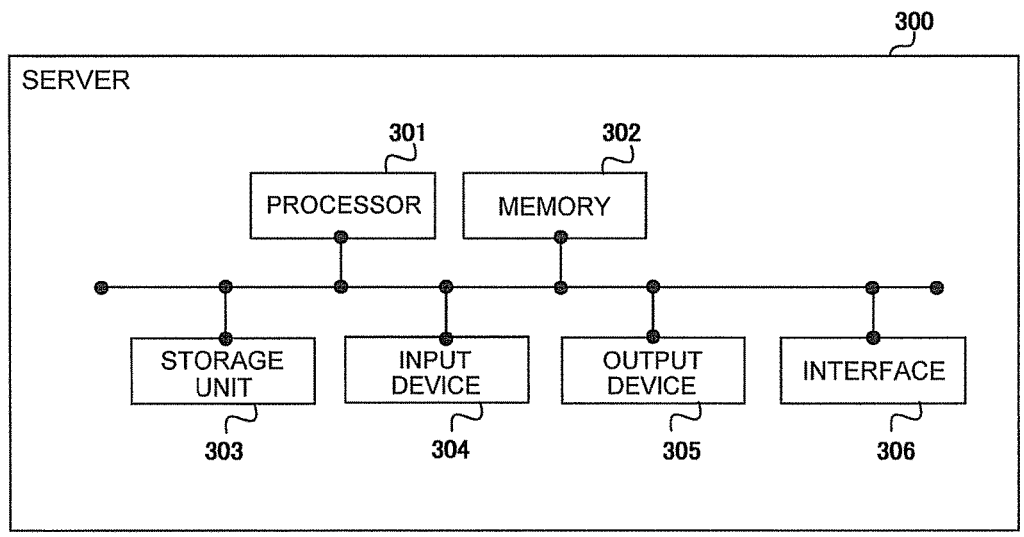
FIG. 5 is a diagram showing an internal configuration example of a server.

FIG. 5 is a block diagram showing an internal configuration example of the server 300. The server 300 is a conventional computer. The server 300 includes a processor 301, which is an arithmetic unit, and a memory 302 including volatile and nonvolatile storage devices. The server 300 includes a storage unit 303, which is an auxiliary storage device such as an HDD. The server 300 includes an input device 304 such as a keyboard and a mouse, an output device 305 such as a monitor, and an interface 306 such as a network card. In order to improve performance, a system to which a plurality of computers are connected may be used as the server 300. The server 300 may include a plurality of internal components (e.g., a processor) for performance improvement.

When the POS terminal 100 is continuously used, maintenance is performed periodically or when a deficiency occurs. During the maintenance, in this embodiment including the configuration explained above, the portable terminal 200 acquires present state setting values from the POS terminal 100 and transmits the present state setting values to the server 300. The server 300 calculates suitable setting values on the basis of the received information. As a method of calculating the suitable setting values, the related art may be used. The server 300 transmits the calculated setting values to the portable terminal 200. The portable terminal 200 transmits the setting values to the POS terminal 100 using the short range wireless communication or the wireless LAN. The POS terminal 100 performs reflection processing in the apparatus such that the present state setting values change to the setting values.

The setting values are data that can be obtained electronically. Therefore, a setting change can be performed by only the transmission and reception of data as explained above. However, information absent in setting values and physical factors such as positional deviation of the ribbons 31 and positional deviation of the roll paper 34 cannot be used as information for making a decision in calculating the suitable setting values. In particular, when the ribbon 31 and the roll paper 34 deviate in the X-axis direction (see FIG. 3) in a lower part of the thermal head 115, suitable printing quality cannot be obtained. Only the setting values cannot be information for making a decision concerning how printing is actually performed. In this embodiment, the suitable setting values are calculated using an image pickup function of the portable terminal 200 taking into account the physical factors and a printing result.

Figure 6:
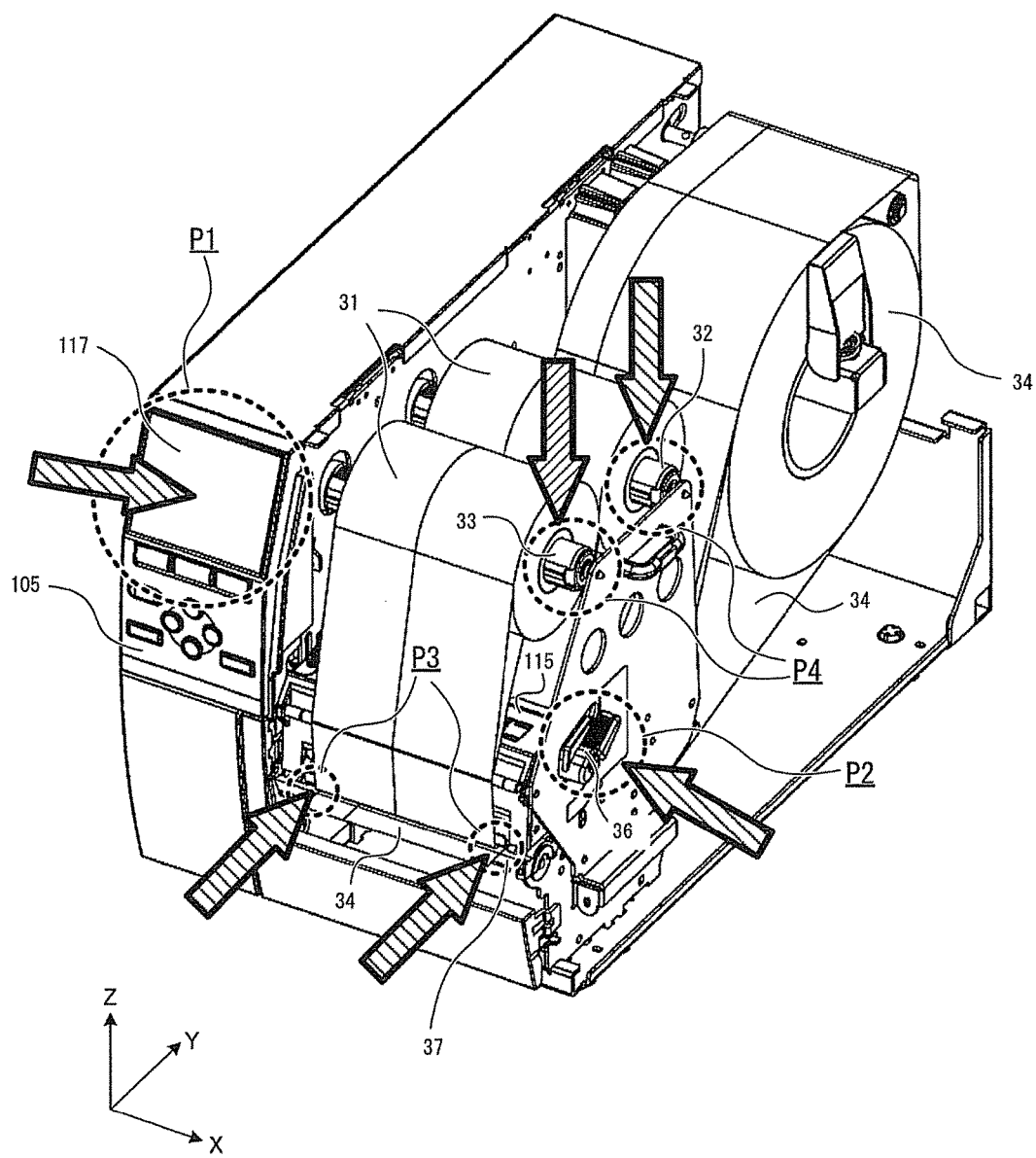
FIG. 6 is a diagram showing examples of image pickup points and image pickup directions.

FIG. 6 shows examples of image pickup target points and image pickup directions of the POS terminal 100. In FIG. 6, the target points are indicated by broken line circle frames and the image pickup directions are indicated by arrows. The target points and the image pickup directions are defined beforehand. Adjusting members of the POS terminal 100 are arranged such that setting information can be visually recognized. The target points and the image pickup directions shown in FIG. 6 are only examples.

By picking up an image of a point P1, peculiar information and present setting values of the POS terminal 100 can be obtained. According to predetermined operation by the maintenance person 600, the peculiar information and the setting values are displayed on the display 117. This information may be displayed in a machine-readable image format such as a QR code or a barcode or may be displayed in a text format. The portable terminal 200 picks up an image of the displayed information and converts the displayed information into image data.

By picking up an image of a point P2, information concerning a label position and a tag position by the lever 36 can be obtained. The lever 36 can adjust the setting in the four stages as explained above. Therefore, present state setting values can be obtained by picking up an image of the position of the lever 36.

By picking up an image of points P3, head attachment states (left and right) on the front surface of the thermal head 115 can be obtained. The positions of the ribbons 31 and the position of the roll paper 34 can also be obtained. The points P3 are regions where positional deviation of expendable items (the ribbons 31 and the roll paper 34) mounted on the POS terminal 100 is likely to occur and are regions where printing quality is markedly deteriorated when the positional deviation occurs. By using image data of the regions, presence or absence of the positional deviation of the ribbons 31 and the roll paper 34 can be determined.

By picking up an image of points P4, identification information of the ribbons 31 can be obtained. Labels or the like indicating a manufacturer that provides the ribbons 31, model numbers of the ribbons 31, serial number peculiar to the ribbons 31, and the like are stuck to the positions of the points P4. In this embodiment, an image of the labels is picked up. When positional deviation in the X-axis direction occurs during conveyance of the ribbons 31, as the ribbon 31 stacked on the front shaft 33 side moves away from the axis (moves to the front surface side) according to use over time, the ribbon 31 is obliquely stacked without being stacked right on the front shaft 33 in the Z-axis direction. By picking up an image of the points P4, presence or absence of the deviation can be used as information for making a decision.

Besides the points, for example, images may be picked up in a region where identification information of an expendable item such as the roll paper 34 is affixed, a region where printing adjustment is performed, and a region where various kinds of positional deviation are likely to occur.

Figure 7A:
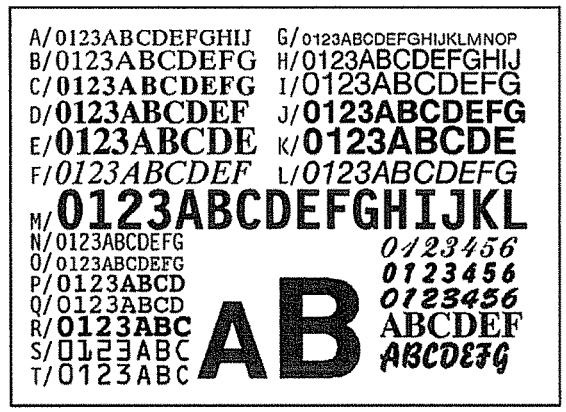
FIGS. 7A to 7C are diagrams showing examples of test patterns printed by the POS terminal.
Figure 7B:
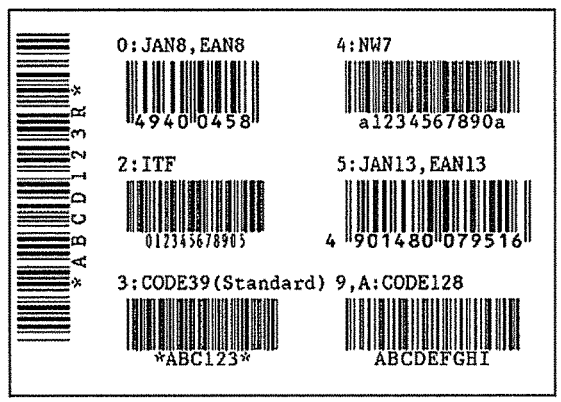
Figure 7C:
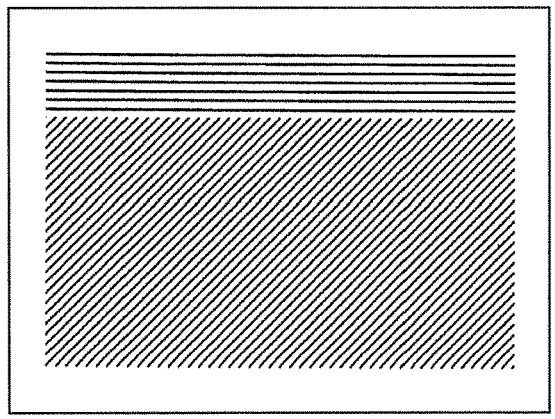

FIGS. 7A to 7C are examples of test patterns printed by the POS terminal 100 according to predetermined operation by the maintenance person 600. The test patterns are specified pattern images defined beforehand. The portable terminal 200 picks up images of the test patterns printed on the roll paper 34.

The portable terminal 200 is set such that an image of specified resolution and specified image size can be obtained when image pickup is performed. On the touch panel display 204 of the portable terminal 200, when image pickup is performed, a line figure indicating an external shape frame or the like of the POS terminal 100 is rendered to overlap an image obtained from the CCD image sensor (an image picked up through a camera lens). The maintenance person 600 moves the portable terminal 200 such that the external frame of the POS terminal 100 seen through the lens coincides with the rendered line figure. When image pickup is performed in a position where the external frame and the line image coincide with each other, the distance between the POS terminal 100 and the portable terminal 200 is set to a specified distance length and the image pickup is performed from a specified direction. Content of the overlapping rendering may be a characteristic point that could be a mark in the image pickup. When images of the test patterns are picked up, similarly, a paper surface frame or the like is displayed in an overlapping manner.

The portable terminal 200 transmits these picked-up image data to the server 300. The server 300 analyzes the received data. As a kind of the analysis, there is a function of extracting setting information from photograph data. Setting values extracted by the function and information concerning setting values in the past of a POS terminal (which may be the POS terminal 100 or may be another POS terminal) are collated. Suitable setting values are calculated on the basis of the collated information.

The server 300 returns the calculated information to the portable terminal 200 with setting photographs and figures added to the information. The maintenance person 600 performs setting of the POS terminal 100 on the basis of the information fed back to the portable terminal 200. The maintenance person 600 checks, for example, visually, whether printing quality is improved. As a result, if additional measures need to be taken, the maintenance person 600 inquires the server 300 about the measures and repeats further fine adjustment. If the adjustment is finally completed, the maintenance person 600 depresses an optimization completion button of the portable terminal 200. Then, the server 300 adds update information. The information is compiled into a database as recommended values for subsequent inquiries and accumulated in the storage unit 303.

Figure 8:
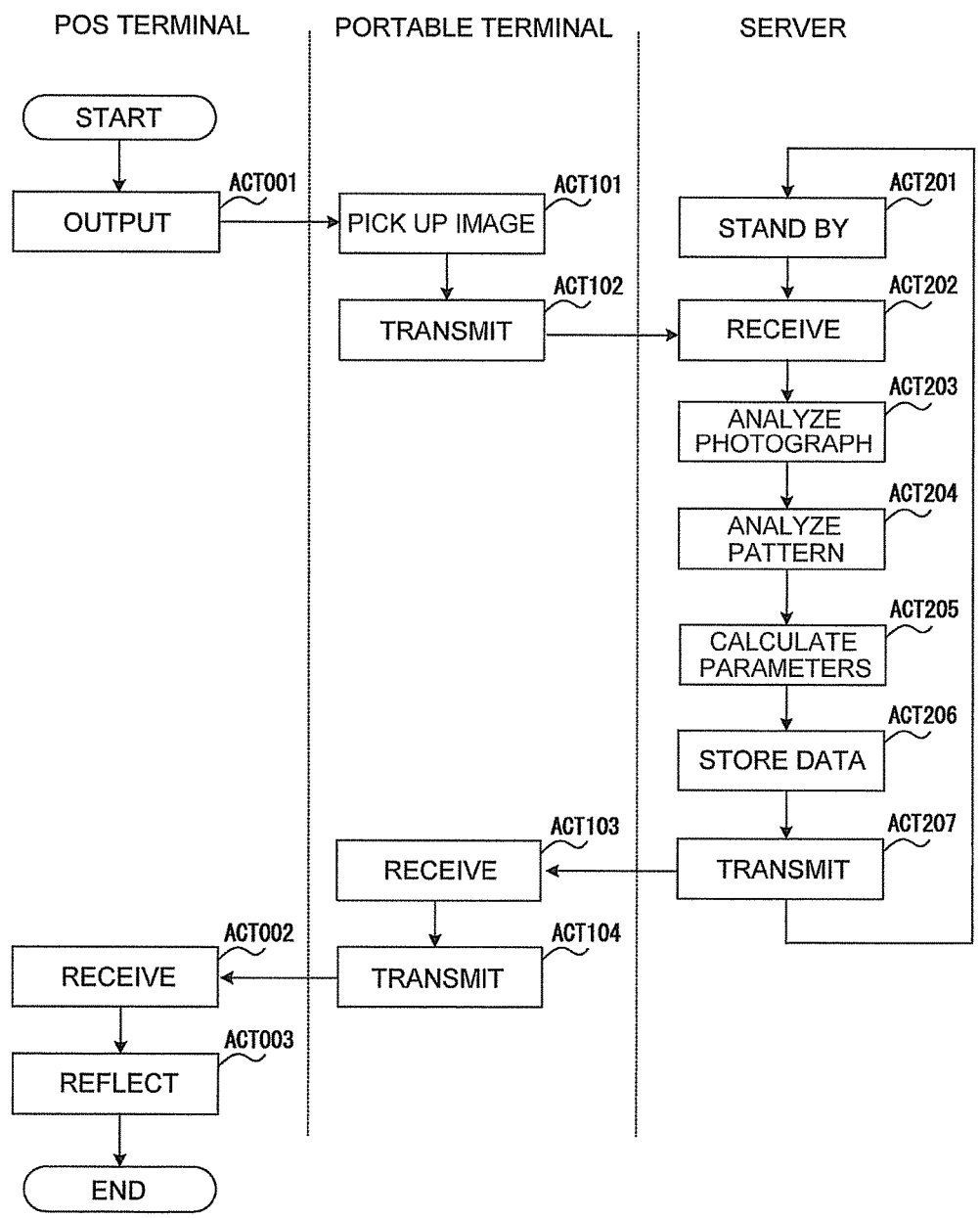
FIG. 8 is a flowchart for explaining an operation example in the embodiment.

FIG. 8 is a flowchart for explaining an operation example in the embodiment. The processors (101, 201, and 301) present in the apparatuses execute computer programs incorporated in the apparatuses beforehand to realize acts shown in FIG. 8 in cooperation with hardware.

The POS terminal 100 displays peculiar information and present state setting values on the display 117 according to predetermined operation by the maintenance person 600 (ACT 001). The POS terminal 100 prints a test pattern (ACT 001). This predetermined operation may be operation on the touch panel display 204 of the portable terminal 200 or may be operation on the key input unit 105 of the POS terminal 100. In the case of the operation in the portable terminal 200, an instruction telegraphic message is output to the POS terminal 100 via the interface 206. The POS terminal 100 performs printing of the test pattern and display of the setting values according to this instruction.

The portable terminal 200 picks up images of the information and the test pattern displayed on the display 117 and picks up images of the points shown in FIG. 6 (ACT 101). The portable terminal 200 transmits this picked-up image data to the server 300 (ACT 102).

The server 300 is in a standby state when no event occurs (ACT 201). When a reception event occurs, the server 300 starts data reception from the portable terminal 200 (ACT 202).

The server 300 analyzes the received image (ACT 203). The analysis is as explained below. An analysis method explained below is only an example.

In the case of image data obtained by picking up an image of the point P1, the server 300 extracts text data using the conventional OCR (Optical Character Reader) technique. In the case of machine-readable image data, the server 300 converts the image data into text data using the conventional technique. Consequently, it is possible to obtain peculiar information and present state setting value of the apparatus.

In the case of image data obtained by picking up an image of the point P2, the server 300 extracts a characteristic point of the lever distal end portion and calculates, on the basis of the position of the point, a present state lever position together with states of the roll paper 34 in FIGS. 7A to 7C.

In the case of image data obtained by picking up an image of the points P3, the server 300 extracts edges of the ribbons 31 and an edge of the roll paper 34, compares the positions of the edges and proper positions, an calculates a deviation amount (in terms of pixels). Concerning an attachment state of the head, similarly, the server 300 extracts edges of the members, compares the positions of the edges with the proper positions, and calculates a deviation amount.

In the case of image data obtained by picking up an image of the points P4, the server 300 specifies the positions of the labels stuck to the ribbons 31 or direct print positions and obtains manufacturer information using, for example, the OCR technique. The server 300 extracts ends (edges) of the top layer surfaces of the ribbons 31, compares the positions of the ends and specified positions, and calculates a deviation amount (in terms of pixels).

Besides above, various analyses can be performed by using or combining conventional image processing technique.

The server 300 performs an analysis of a test pattern to be subjected to image pickup according to the conventional image processing technique (e.g., edge detection, binarization processing, and characteristic point extraction) (ACT 204). The server 300 determines whether a printing position is within a specified range. When the printing position deviates from the specified range, the server 300 calculates a deviation amount of the printing position. The server 300 determines whether printing density is proper. This analysis content is only an example.

The server 300 calculates parameters on the basis of the peculiar information, the present state setting values, the lever position, the various deviation amounts, and the density value obtained from the image data (ACT 205). The server 300 acquires the recommended value accumulated in the storage unit 303 and performs case classification, conditional branching, and the like to calculate parameters. The parameters to be obtained are, for example, the position of the lever 36, values for controlling the up down position and the heat value of the thermal head 115, and adjustment values for heat generation timing and heat generation time.

The server 300 stores the image data transmitted from the portable terminal 200, data obtained by analyzing the image data, and the calculated parameters as a set (ACT 206). The calculated parameters to be stored indicate recommended values at the present point. However, when the fine adjustment is performed as explained above, the parameters are replaced with parameters after the fine adjustment. The server 300 transmits the calculated parameters to the portable terminal 200 (ACT 207). At this point, the server 300 transmits text data in which a setting change method is described, photographs, and figures (hereinafter, procedure data) to the portable terminal 200 (ACT 207). The procedure data is stored in the storage unit 303 of the server 300 beforehand. After the transmission, the server 300 returns to the standby state (ACT 201).

The portable terminal 200 receives the parameters and the procedure data transmitted thereto (ACT 103) and transfers the parameters to the POS terminal 100 (ACT 104). The POS terminal 100 receives the parameters (ACT 002) and thereafter updates (reflects) a storage state to operate using the parameters (ACT 003). The portable terminal 200 displays the procedure data on the touch panel display 204. The touch panel display 204 displays both of text information for explaining a specific procedure such as "Please set the lever in the tug position" and "The fastener for the roll paper is loosened" and an image indicating a region corresponding to the text information such as the lever 36. When the POS terminal 100 does not have an automatic reflection function, the touch panel display 204 also displays an input method for setting values. The maintenance person 600 performs, according to content of the display, physical setting such as a change of a lever position and elimination of positional deviation of the ribbons 31 and the roll paper 34.

Thereafter, the maintenance person 600 prints the test pattern and checks printing quality, for example, visually. Fine adjustment is performed according to necessity.

In this embodiment, the inquiry to the server, the reflection of pointed-out matters, and the like are performed as artificial work using the portable terminal 200 on the outside. However, if the POS terminal 100 and the server 300 can directly perform communication and the main body of the POS terminal 100 includes a feedback mechanism for transmitting setting information to the server 300 and acquiring and reflecting parameters, all the operations can be automatically carried out.

The image pickup unit, the transmitting unit, and the display unit correspond to the portable terminal 200 in the embodiment. The control unit and the storing unit correspond to the server 300 in the embodiment.

Even if the server 300 on the outside is not used, when the portable terminal 200 has functions and specifications equivalent to those of the server 300, only the portable terminal 200 can perform all the operations. In this case, the image pickup unit corresponds to the camera 207 in the embodiment and the control unit corresponds to the processor 201 in the embodiment. The transmitting unit corresponds to the interface 206 in the embodiment and the display unit corresponds to the touch panel display 204. The storing unit corresponds to the storage unit 203.

In the example explained above, the maintenance target is the POS terminal. However, the maintenance target is not limited to the POS terminal. For example, the maintenance system and the maintenance method can be applied to any apparatus such as an image forming apparatus.

In the explanation in this embodiment, the function for carrying out the invention is recorded in the apparatus in advance. However, the same function may be downloaded to the apparatus from a network. The same function recorded in a recording medium may be installed in the apparatus. A form of the recording medium may be any form as long as the recording medium is a recording medium that can store a computer program and can be read by the apparatus such as a CD-ROM. The functions obtained by the installation or the download in advance in this way may be realized in cooperation with an OS (operating system) in the apparatus.

As explained above in detail, according to the technique described in this specification, it is possible to obtain suitable parameters of the apparatus taking into account not only the setting values but also physical state information.

While certain embodiments have been described, these embodiments have been presented by way of example only, and are not intended to limit the scope of inventions. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. A maintenance system for a target apparatus, the target apparatus including a printing unit having a region for a user to physically set a position, and a first display unit configured to display setting information of the printing unit, the maintenance system comprising:
a portable terminal having an image pickup unit configured to pick up images of the region of the printing unit and the setting information displayed on the first display unit, and a second display unit;
a server having a communication unit configured to communicate with the portable terminal, a processor, and a memory,
the portable terminal being configured to transmit image data of the region of the printing unit and image data of the setting information to the server,
the server being configured to perform image processing on the image data of the region of the printing unit to obtain a physical position of the region of the printing unit, to perform image processing on the image data of the setting information to obtain electronic setting information, and to calculate, on a basis of the physical position of the region of the printing unit and the electronic setting information, a change position of the physical position of the region of the printing unit and transmit the change position to the portable terminal, and
the portable terminal being configured to display the change position on the second display unit.

2. The maintenance system according to claim 1, wherein the region of the printing unit is a region where printing adjustment for the printing unit is performed, and
the server obtains a position of the region, where the printing adjustment is performed, in the printing unit.

3. The maintenance system according to claim 1, wherein the region of the printing unit is a region where positional deviation of an expendable item mounted on the target apparatus is likely to occur, and
the server obtains a position of the expendable item in the printing unit.

4. The maintenance system according to claim 1, wherein the region of the printing unit is an attachment region of a printing head of the printing unit, and
the server obtains a position of the printing head in the printing unit.

5. The maintenance system according to claim 1, wherein the server stores a setting change method and transmits the change position and the setting change method to the portable terminal.

6. A maintenance method for a target apparatus, the target apparatus including a printing unit where a region for a user to physically set a position is disposed, and a first display unit configured to display setting information of the printing unit, the maintenance method comprising:
- a portable terminal, which has an image pickup unit configured to pick up images of the region of the printing unit and the setting information displayed on the first display unit and a second display unit, transmitting image data of the region of the printing unit and image data of the setting information to the server;
- a server, which has a communication unit configured to communicate with the portable terminal, a processor, and a memory, performing image processing on the image data of the region of the printing unit to obtain a physical position of the region of the printing unit, the server performing image processing on the image data of the setting information to obtain electronic setting information, and the server calculating, on a basis of the physical position of the region of the printing unit and the electronic setting information, a change position of the physical position of the region of the printing unit and transmitting the change position to the portable terminal; and the portable terminal displaying the change position on the second display unit.

7. The maintenance method according to claim 6, wherein the region of the printing unit is a region where printing adjustment for the printing unit is performed, and the server obtains a position of the region, where the printing adjustment is performed, in the printing unit.

8. The maintenance method according to claim 6, wherein the region of the printing unit is a region where positional deviation of an expendable item mounted on the target apparatus is likely to occur, and the server obtains a position of the expendable item in the printing unit.

9. The maintenance method according to claim 6, wherein the region of the printing unit is an attachment region of a printing head of the printing unit, and the server obtains a position of the printing head in the printing unit.

* * * * *